United States Patent
Gamage et al.

(10) Patent No.: US 10,677,001 B2
(45) Date of Patent: *Jun. 9, 2020

(54) DOWNHOLE IN-SITU HEAT GENERATION TO REMOVE FILTERCAKE

(71) Applicant: Saudi Arabian Oil Company, Dhahran (SA)

(72) Inventors: Pubudu Gamage, Katy, TX (US); Matthew Hilfiger, Katy, TX (US)

(73) Assignee: Saudi Arabian Oil Company, Dhahran (SA)

( * ) Notice: Subject to any disclaimer, the term of this patent is extended or adjusted under 35 U.S.C. 154(b) by 0 days.

This patent is subject to a terminal disclaimer.

(21) Appl. No.: 16/502,657

(22) Filed: Jul. 3, 2019

(65) Prior Publication Data

US 2019/0323303 A1 Oct. 24, 2019

Related U.S. Application Data

(63) Continuation of application No. 14/965,242, filed on Dec. 10, 2015, now Pat. No. 10,400,527.

(51) Int. Cl.
*E21B 37/06* (2006.01)
*E21B 21/00* (2006.01)
(Continued)

(52) U.S. Cl.
CPC .............. *E21B 21/00* (2013.01); *C09K 8/03* (2013.01); *C09K 8/035* (2013.01); *C09K 8/50* (2013.01);
(Continued)

(58) Field of Classification Search
CPC .................................. E21B 37/06; E21B 37/00
See application file for complete search history.

(56) References Cited

U.S. PATENT DOCUMENTS

| 4,506,734 A | 3/1985 | Nolte |
|---|---|---|
| 4,919,209 A | 4/1990 | King |

(Continued)

FOREIGN PATENT DOCUMENTS

| CN | 1390276 | 1/2003 |
|---|---|---|
| CN | 1977027 | 6/2007 |

(Continued)

OTHER PUBLICATIONS

European Communication Pursuant to Article 94(3) EPC issued in European Application No. 16791235.1 dated Jun. 19, 2019, 6 pages.

(Continued)

*Primary Examiner* — Giovanna C Wright
(74) *Attorney, Agent, or Firm* — Fish & Richardson P.C.

(57) ABSTRACT

In a method to degrade filtercake in a hydrocarbon reservoir using downhole in-situ heat generation, a filtercake breaker, configured to degrade filtercake at a temperature, is mixed with a drilling fluid. The drilling fluid mixed with the filtercake breaker is flowed through a hydrocarbon reservoir in which a wellbore is being drilled. A filtercake forms in a portion of the hydrocarbon reservoir responsive to flowing the drilling fluid. A temperature of the portion of the hydrocarbon reservoir is less than the temperature at which the filtercake breaker is configured to degrade filtercake. Multiple filtercake chemicals are flowed to the portion of the hydrocarbon reservoir. The multiple filtercake chemicals, when mixed, are configured to react in an exothermic reaction to release heat to increase the temperature of the portion of the hydrocarbon reservoir to at least the temperature at which the filtercake breaker is configured to degrade filtercake.

8 Claims, 4 Drawing Sheets

(51) Int. Cl.
*C09K 8/536* (2006.01)
*C09K 8/52* (2006.01)
*C09K 8/516* (2006.01)
*C09K 8/50* (2006.01)
*C09K 8/03* (2006.01)
*C09K 8/035* (2006.01)

(52) U.S. Cl.
CPC ............... *C09K 8/516* (2013.01); *C09K 8/52* (2013.01); *C09K 8/536* (2013.01); *E21B 37/06* (2013.01); *C09K 2208/26* (2013.01)

(56) References Cited

U.S. PATENT DOCUMENTS

| | | | |
|---|---|---|---|
| 5,217,074 A | 6/1993 | McDougall et al. | |
| 6,028,233 A | 2/2000 | Colle | |
| 6,110,875 A | 8/2000 | Tjon-Joe-Pin et al. | |
| 6,162,766 A | 12/2000 | Muir et al. | |
| 6,818,594 B1 | 11/2004 | Freeman et al. | |
| 6,924,253 B2 | 8/2005 | Palmer et al. | |
| 7,000,701 B2 | 2/2006 | Todd et al. | |
| 7,709,421 B2 | 5/2010 | Jones et al. | |
| 7,712,536 B2 | 5/2010 | Pirolli et al. | |
| 7,855,168 B2 | 12/2010 | Fuller et al. | |
| 8,695,704 B2 | 4/2014 | Muthusamy et al. | |
| 10,400,527 B2* | 9/2019 | Gamage | E21B 21/00 |
| 2008/0067108 A1 | 3/2008 | Sarkar et al. | |
| 2009/0221453 A1 | 9/2009 | Mukhopadhyay et al. | |
| 2010/0252267 A1 | 10/2010 | Harris et al. | |
| 2011/0114323 A1 | 5/2011 | Jennings | |
| 2012/0000652 A1 | 1/2012 | Jones | |
| 2014/0151042 A1 | 6/2014 | Faugerstrom | |
| 2014/0290951 A1 | 10/2014 | Al-Taq et al. | |
| 2015/0000912 A1 | 1/2015 | Choudhary et al. | |
| 2015/0300142 A1 | 10/2015 | Al-Nakhli et al. | |
| 2017/0073571 A1 | 3/2017 | Salla | |
| 2017/0267912 A1 | 9/2017 | Mekade | |

FOREIGN PATENT DOCUMENTS

| | | |
|---|---|---|
| CN | 101679846 | 3/2010 |
| CN | 104312570 | 1/2015 |
| WO | 2009074795 | 6/2009 |
| WO | 2014165347 | 10/2014 |
| WO | 2015187122 | 12/2015 |

OTHER PUBLICATIONS

International Search Report and Written Opinion of the International Searching Authority issued in International Application No. PCT/US2016/058627 dated Jan. 19, 2017; 13 pages.

Parker et al., "Properties and Application of Delayed-Release Breakers", Society of Petroleum Engineers, SPE 24300, Apr. 1992, 10 pages.

Gulf Cooperation Council Examination Report issued in GCC Application No. GC2016-32511 dated Sep. 19, 2019, 4 pages.

European Communication Pursuant to Article 94(3) EPC issued in European Application No. 16791235.1 dated Jan. 20, 2020, 7 pages.

Gulf Cooperation Council Examination Report issued in GCC Application No. GC 2016-32511 dated Dec. 31, 2019, 3 pages.

Chinese Office Action issued in Chinese Application No. 201680072571.3 dated Apr. 28, 2020, 8 pages.

* cited by examiner

DOWNHOLE IN-SITU HEAT GENERATION TO REMOVE FILTERCAKE

CROSS-REFERENCE TO RELATED PATENT APPLICATIONS

This application is a continuation of and claims the benefit of priority to U.S. patent application Ser. No. 14/965,242, filed Dec. 10, 2015, the contents of which are incorporated by reference herein.

TECHNICAL FIELD

This disclosure relates to generating heat in-situ in downhole locations, for example, hydrocarbon reservoirs.

BACKGROUND

Wellbores are drilled in hydrocarbon reservoirs to produce hydrocarbons (for example, oil, gas, or hydrocarbons or combinations of them) trapped in the hydrocarbon reservoirs. Drilling fluid is used to aid drilling wellbores in the hydrocarbon reservoirs. Drilling fluids (also known as drilling muds) can be classified into three types—water-based muds, non-aqueous muds, gaseous drilling fluids. The drilling fluid serves many roles, for example, providing a hydrostatic pressure to prevent the fluids in the formation from entering into the wellbore, keeping the drill bit cool and clean during the drilling operation, carrying drill cuttings out of the wellbore and suspending the drill cuttings when drilling is halted, to name a few.

During the drilling operation, reservoir drilling fluid is circulated within the drilling equipment to cool the drill bit, reduce friction between the drill string and the sides of the borehole and also to form a filtercake to prevent filtrate leak-off into the formation when drilling through pay zone. The driving force for the formation of the filtercake is the pressure applied to maintain the stability of the borehole. The filtercake, however, can restrict the flow of fluids into the wellbore during the drilling process or during completion or both. Filtercake properties, for example, thickness, toughness, slickness, permeability, or other properties, can cause the pipe to stick or cause other drilling problems. Reservoir productivity can be compromised if the filtercake damage is not removed prior to or during completion of the well.

SUMMARY

This disclosure describes removal of filtercake from hydrocarbon reservoirs, for example, oil wells producing medium to heavy oil or oil wells found in low draw-down pressure reservoirs. This disclosure also describes downhole in-situ heat generation, for example, using a thermochemical reaction, to remove filtercake.

Certain aspects of the subject matter can be implemented as a method of degrading filtercake in a hydrocarbon reservoir. A filtercake breaker is mixed with a drilling fluid. The filtercake breaker is configured to degrade filtercake at a temperature. The drilling fluid mixed with the filtercake breaker is flowed through a hydrocarbon reservoir in which a wellbore is being drilled. A filtercake forms in a portion of the hydrocarbon reservoir responsive to flowing the drilling fluid. A temperature of the portion of the hydrocarbon reservoir is less than the temperature at which the filtercake breaker is configured to degrade filtercake. Multiple filtercake chemicals are flowed to the portion of the hydrocarbon reservoir. The multiple filtercake chemicals, when mixed, are configured to react in an exothermic reaction to release heat to increase the temperature of the portion of the hydrocarbon reservoir to at least the temperature at which the filtercake breaker is configured to degrade filtercake.

This, and other aspects, can include one or more of the following features. The multiple filtercake chemicals can include a terpene base fluid and at least one of an organic acid or a catalyst solution. The organic acid can include dodecylbenzylsulfonic acid (DDBSA). The catalyst solution can include a Lewis acid. A byproduct of the exothermic reaction can exclude gases. To flow the multiple filtercake chemicals to the portion of the hydrocarbon reservoir, the multiple filtercake chemicals can be mixed with the drilling fluid. The drilling fluid mixed with the multiple filtercake chemicals can be flowed to the portion of the hydrocarbon reservoir. The multiple filtercake chemicals can be mixed with each other before flowing the multiple filtercake chemicals to the portion of the hydrocarbon reservoir. The multiple filtercake chemicals can be mixed with each other at a surface of the hydrocarbon reservoir. To mix the multiple filtercake chemicals, a first filtercake chemical can be flowed from a surface of the hydrocarbon reservoir toward the portion of the hydrocarbon reservoir. After flowing the first filtercake chemical, a second filtercake chemical can be flowed from the surface of the hydrocarbon reservoir toward the portion of the hydrocarbon reservoir. A difference in a density of the filter filtercake chemical and a density of the second filtercake chemical can cause the first filtercake chemical and the second filtercake chemical to mix before a mixture of the two reaches the portion of the hydrocarbon reservoir. A volumetric flow rate of at least one of the first filtercake chemical or the second filtercake chemical can be controlled to cause the first filtercake chemical and the second filtercake chemical to mix before reaching the portion of the hydrocarbon reservoir. The filtercake breaker can be encapsulated before mixing the filtercake breaker with the drilling fluid. Heat from the exothermic reaction can degrade an encapsulation surrounding the filtercake breaker causing the filtercake breaker to directly contact the filtercake.

Certain aspects of the subject matter described here can be implemented as a method of degrading filtercake in a hydrocarbon reservoir. A filtercake breaker is encapsulated with an encapsulation configured to prevent the encapsulated filtercake breaker from directly contacting a filtercake. The filtercake breaker is configured to degrade filtercake at a temperature. The encapsulated filtercake breaker is mixed with a drilling fluid. The drilling fluid mixed with the encapsulated filtercake breaker is flowed through a hydrocarbon reservoir in which a wellbore is being drilled. A filtercake forms in a portion of the hydrocarbon reservoir responsive to flowing the drilling fluid. The encapsulated filtercake breaker is embedded within the filtercake. A temperature of the portion of the hydrocarbon reservoir is less than the temperature at which the filtercake breaker is configured to degrade filtercake. Multiple filtercake chemicals are flowed to the portion of the hydrocarbon reservoir. The multiple filtercake chemicals, when mixed, are configured to react in an exothermic reaction to release heat to increase the temperature of the portion of the hydrocarbon reservoir to at least a temperature at which the filtercake breaker is released from the encapsulation and the filtercake breaker is configured to degrade the filtercake in which the filtercake breaker is embedded.

This, and other aspects, can include one or more of the following features. The multiple filtercake chemicals can include a terpene base fluid and at least one of an organic acid or a catalyst solution. The organic acid can include dodecylbenzylsulfonic acid (DDBSA). The catalyst solution can include a Lewis acid. A byproduct of the exothermic reaction can exclude gases.

Certain aspects of the subject matter described here can be implemented as a method of degrading filtercake in a hydrocarbon reservoir. A filtercake breaker is mixed with a drilling fluid. The filtercake breaker is configured to degrade filtercake at a temperature. The drilling fluid mixed with the filtercake breaker is flowed through a hydrocarbon reservoir in which a wellbore is being drilled. A filtercake forms in a portion of the hydrocarbon reservoir responsive to flowing the drilling fluid. The filtercake breaker can be embedded within the filtercake. A temperature of the portion of the hydrocarbon reservoir is less than the temperature at which the filtercake breaker is configured to degrade filtercake. After the filtercake has formed, a terpenese base fluid is assed to the drilling fluid flowed to the portion of the hydrocarbon reservoir. After adding the terpene base fluid, an organic acid or a catalyst solution is added to the drilling fluid flowed to the portion of the hydrocarbon reservoir. The terpene base solution mixed with the organic acid or the catalyst solution before reaching the portion of the hydrocarbon reservoir. When mixed, the terpene base fluid reacts with the organic acid or the catalyst solution in an exothermic reaction to release heat to increase the temperature of the portion of the hydrocarbon reservoir to at least the temperature at which the filtercake breaker is configured to degrade filtercake.

This, and other aspects, can include one or more of the following features. A volumetric flow rate of at least one of the drilling fluid to which the terpene base fluid is added or the drilling fluid to which the organic acid or the catalyst solution is added can be controlled to cause the terpene base solution and the organic acid or the catalyst solution to mix before reaching the portion of the hydrocarbon reservoir. The filtercake breaker can be encapsulated before mixing the filtercake breaker with the drilling fluid. Heat from the exothermic reaction can degrade an encapsulation surrounding the filtercake breaker causing the filtercake breaker to directly contact the filtercake. A byproduct of the exothermic reaction can exclude gases.

The details of one or more implementations of the subject matter described in this specification are set forth in the accompanying drawings and the description below. Other features, aspects, and advantages of the subject matter will become apparent from the description, the drawings, and the claims.

DETAILED DESCRIPTION

A filtercake breaker system is a chemical composition which, upon contacting (for example, mixing, touching or otherwise contacting) a filtercake, reacts with the filtercake to degrade, deteriorate and destroy the filtercake. Oil field breakers can be classified into three categories: acids, enzymes and oxidizers. Acids are utilized to remove filtercake in payzones. Oxidative and enzyme breakers are used to degrade polymers in downhole applications. Oxidative breakers can be applied in wider temperature range compared to enzyme-based breaker systems. Oxidative breakers are a class of chemicals that thermally decompose and generate free radicals. Those radicals degrade the molecular weight of and reduce viscosity of polymers in a short duration.

Delayed breaker systems are used in downhole applications to deliver the breaker to a specific place in the wellbore. Certain breaker systems can be activated by temperature, for example, the natural downhole temperature at the specific place to which the breaker is delivered, to trigger chemical release. In some situations, the downhole temperature at the specific place at which the filtercake is formed may not be sufficient to trigger delayed breaker release.

This disclosure describes a method to increase downhole temperature by a thermochemical reaction, for example, an exothermic reaction. The heat emitted from the exothermic reaction acts as a trigger to activate a delayed breaker to release the breaker at the specific place in the wellbore. Such a delayed breaker system can be used to remove filtercake at the specific place in the wellbore without needing to depend on the downhole temperature at the specific place. Heat generated from the exothermic reaction can be utilized to control the rate of chemical release from the delayed breaker.

Figure 1:
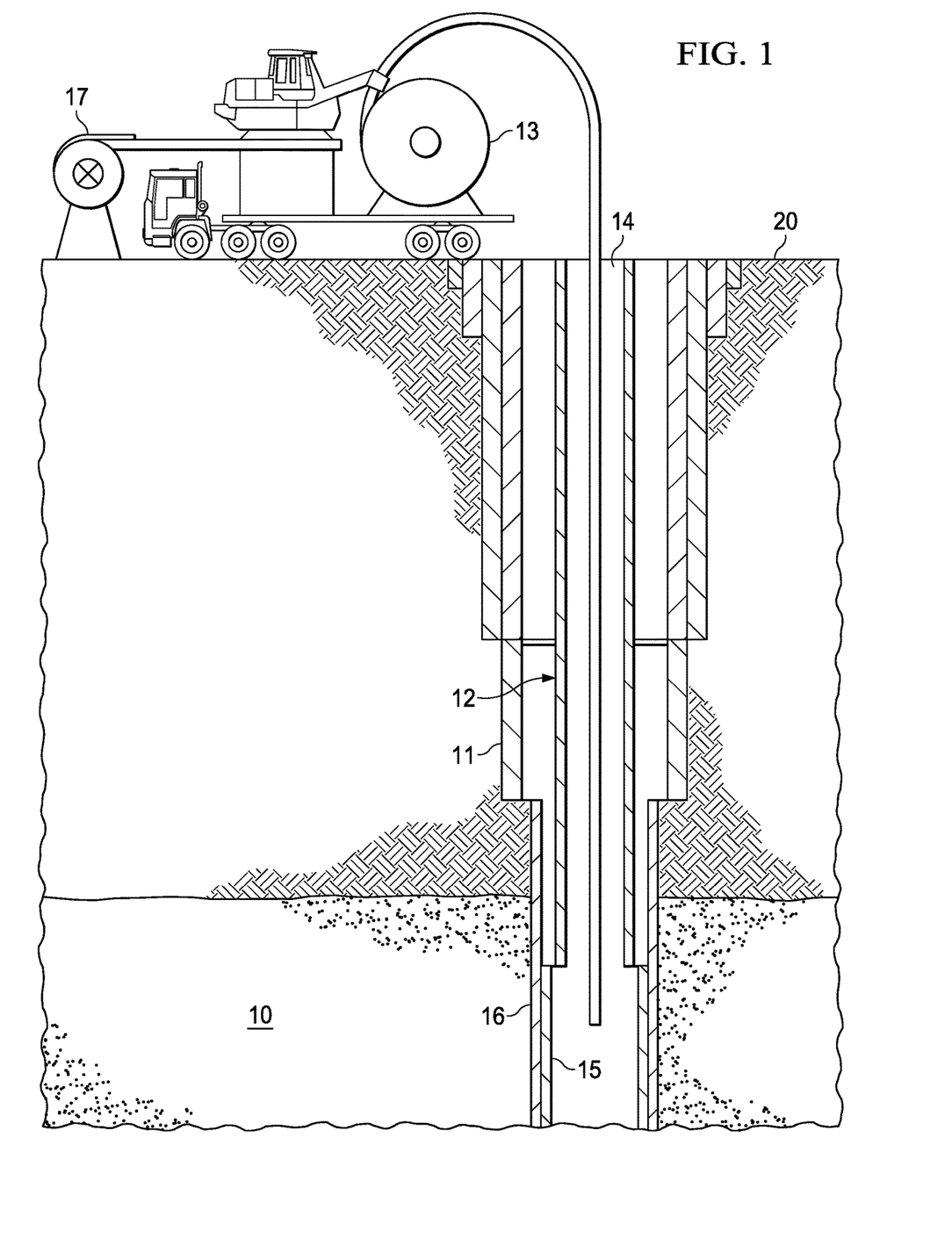
FIG. 1 is a schematic representation of a drilling operation in a hydrocarbon reservoir.

FIG. 1 is a schematic representation of a drilling operation in a hydrocarbon reservoir. In FIG. 1, a well 11 has been or is being drilled through a hydrocarbon reservoir 10. The hydrocarbon reservoir 10 can span across a subterranean zone (for example, a formation, a portion of a formation or all or portions of multiple formations). The well 11 can extend across less than or all of one or more portions in the subterranean zone. Production tubing 12 and a coiled tubing 13 extend down into a wellbore 14 which extends into the hydrocarbon reservoir 10. During the drilling operation, a filtercake 15 is formed at the bottom of well casing 16 where the filtercake 15 meets the hydrocarbon reservoir 10.

Figure 2:
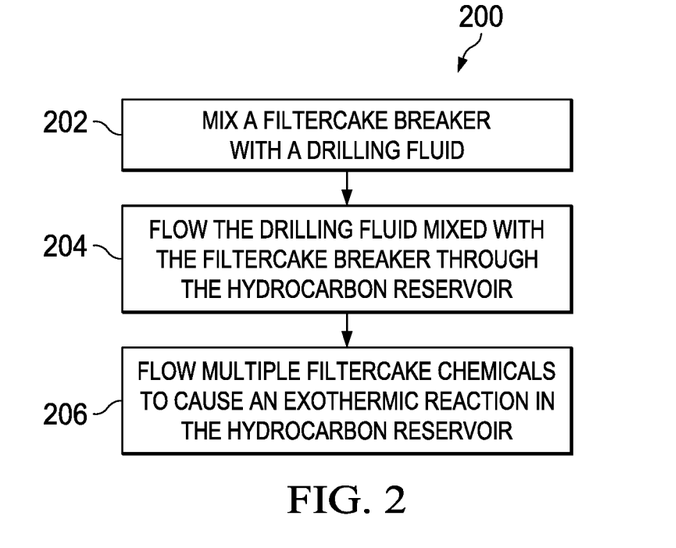
FIG. 2 is a flowchart of an example of a process for degrading filtercake in a hydrocarbon reservoir.

FIG. 2 is a flowchart of an example of a process 200 for degrading filtercake in a hydrocarbon reservoir, for example, the hydrocarbon reservoir 10. In some implementations, the process 200 can be implemented by a drilling rig operator during the drilling operation or before completion of the wellbore, for example, the wellbore 14. At 202, a filtercake breaker is mixed with a drilling fluid, for example, an aqueous or non-aqueous drilling fluid. The filtercake breaker is configured to degrade or destroy filtercake at a temperature. That is, when a temperature of a portion of the hydrocarbon reservoir (or wellbore) in which the filtercake breaker is disposed reaches a certain temperature, the filtercake breaker can degrade or destroy the filtercake in the portion of the hydrocarbon reservoir (or wellbore). A concentration of the filtercake breaker in the drilling fluid can range between about 0.01% to 2% by weight. In implementations in which delayed-release breaker system is used, a concentration of breakers in the delayed-release breaker system can range between 80% and 50% by weight. OPTI-FLO III™, which includes encapsulated ammonium persulfate, is an example of a delayed-released breaker system. Other delayed-release breaker systems can also be implemented.

Because the filtercake breaker is mixed with the drilling fluid, the filtercake that is formed in any portion of the wellbore includes the filtercake breaker embedded within the filtercake. That is, the filtercake breaker will embedded in or be mixed with or be in contact with the filtercake that will be formed in the wellbore at a later time. Consequently, the filtercake breaker need not be flowed to the filtercake after the filtercake has formed in the wellbore. Rather, the filtercake can be degraded or destroyed (or both) by triggering the filtercake breaker which was embedded within the filtercake when the filtercake was formed.

At 204, the drilling fluid mixed with the filtercake breaker is flowed through a hydrocarbon reservoir, for example, the hydrocarbon reservoir 10, in which a wellbore, for example, the wellbore 14, is being drilled. A filtercake forms in a portion of the hydrocarbon reservoir (or the wellbore) responsive to flowing the drilling fluid. As described above, the filtercake breaker is mixed with or embedded within the filtercake that forms in the portion. The temperature at which the embedded filtercake breaker triggers to degrade or destroy the filtercake can be greater than the temperature of the portion of the hydrocarbon reservoir (or the wellbore) in which the filtercake is formed. As described below, an exothermic reaction can be caused at the portion to increase the temperature of the portion to at least the temperature at which the filtercake breaker triggers to degrade or destroy the filtercake.

In some implementations, an embedding of the filtercake breaker within the filtercake can be controlled. For example, the filtercake breaker can be mixed with a drilling fluid prior to commencing the drilling operation or during the early stages of the drilling operation. Doing so can cause the filtercake breaker to be mixed with the filtercake regardless of where the filtercake is formed. Alternatively or in addition, the filtercake breaker can be mixed with the drilling fluid when a particular portion of the hydrocarbon reservoir, for example, the zone in which the hydrocarbons are trapped, is being drilled. Doing so can cause the filtercake breaker to be mixed only with the filtercake formed in the particular portion of the hydrocarbon reservoir. In addition, the mixing of the filtercake breaker can be stopped after the particular portion of the hydrocarbon reservoir has been drilled. Doing so can cause subsequent filtercake to not include embedded filtercake breakers.

At 206, multiple filtercake chemicals are flowed through the hydrocarbon reservoir to cause an exothermic reaction. For example, the multiple filtercake chemicals are flowed to the portion of the hydrocarbon reservoir in which the filtercake forms. The multiple filtercake chemicals, when mixed, react in an exothermic reaction to release heat to increase the temperature of the portion of the hydrocarbon reservoir to at least the temperature at which the filtercake breaker is configured to degrade filtercake. In this manner, the filtercake chemicals react in an exothermic reaction to generate in-situ heat in the wellbore at the portion of the hydrocarbon reservoir in which the filtercake is formed. The generated heat increases the temperature of the downhole location to a temperature level at which the filtercake breaker embedded within the filtercake is triggered. Once triggered, the filtercake breaker reacts with the filtercake to degrade or destroy the filtercake, thereby accomplishing filtercake removal.

Figure 3:
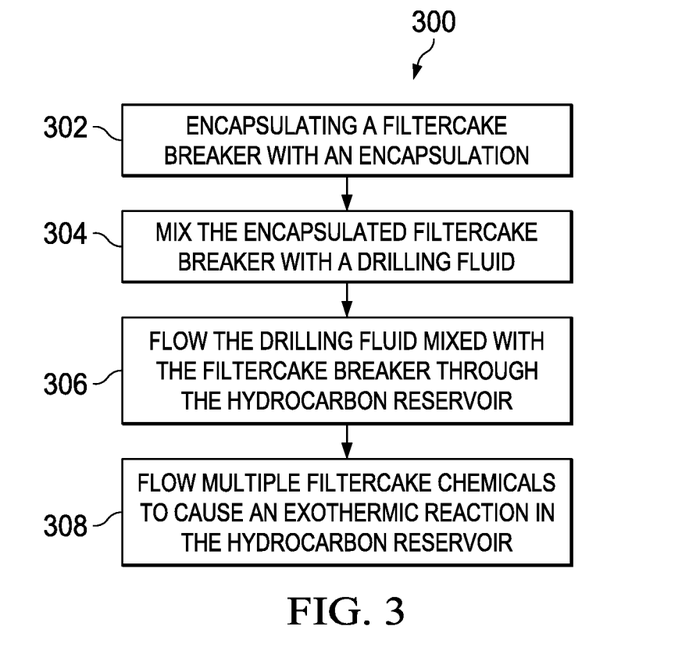
FIG. 3 is a flowchart of an example process for degrading filtercake in a hydrocarbon reservoir.

FIG. 3 is a flowchart of an example process 300 for degrading filtercake in a hydrocarbon reservoir. In some implementations, at least some steps of the process 300 can be implemented by a drilling rig operator during the drilling operation or before completion of the wellbore, for example, the wellbore 14. At 302, a filtercake breaker is encapsulated with an encapsulation. The encapsulation, for example, a coating surrounding the filtercake breaker and containing the filtercake breaker within the coating, prevents the encapsulated filtercake from directly contacting a filtercake. Coated or encapsulated filtercake breakers can be implemented to achieve controllable filtercake breaker release rates in downhole applications or to release filtercake breakers at specific locations in the hydrocarbon reservoir (or the wellbore) or both. Such encapsulated filtercake breakers can be triggered based on downhole conditions, for example, temperature, pH or other downhole conditions, to trigger filtercake breaker release through the encapsulation.

At 304, the encapsulated filtercake breaker is mixed with a drilling fluid similar to step 202 described above with reference to FIG. 2. At 306, the drilling fluid mixed with the filtercake breaker is flowed through a hydrocarbon reservoir, for example, the hydrocarbon reservoir 10, in which a wellbore, for example, the wellbore 14, is being drilled, similar to step 204 described above with reference to FIG. 2. A filtercake forms in a portion of the hydrocarbon reservoir (or the wellbore) responsive to flowing the drilling fluid. As described above, the encapsulated filtercake breaker is mixed with or embedded within the filtercake that forms in the portion. Because the encapsulation within which the filtercake breaker is contained prevents the filtercake breaker from directly contacting the filtercake, the filtercake breaker does not degrade or destroy the filtercake. Sometimes, in addition, the temperature at which the embedded filtercake breaker triggers to degrade or destroy the filtercake can be greater than the temperature of the portion of the hydrocarbon reservoir (or the wellbore) in which the filtercake is formed. As described below, an exothermic reaction can be caused at the portion to increase the temperature of the portion to at least the temperature at which the encapsulation releases the filtercake breaker and, if necessary, the filtercake breaker triggers to degrade or destroy the filtercake.

At 308, multiple filtercake chemicals are flowed through the hydrocarbon reservoir to cause an exothermic reaction. For example, the multiple filtercake chemicals are flowed to the portion of the hydrocarbon reservoir in which the filtercake forms. The multiple filtercake chemicals, when mixed, react in an exothermic reaction to release heat to increase the temperature of the portion of the hydrocarbon reservoir. The increased temperature can be sufficient to break the encapsulation to release the filtercake breaker to directly contact the filtercake. Such direct contact can cause the filtercake breaker to degrade or destroy the filtercake. In addition to breaking the encapsulation, the increased temperature can also be sufficient to trigger the filtercake breaker to degrade filtercake. In this manner, the filtercake chemicals react in an exothermic reaction to generate in-situ heat in the wellbore at the portion of the hydrocarbon reservoir in which the filtercake is formed. The generated heat increases the temperature of the downhole location to a temperature level at which the filtercake breaker embedded within the filtercake is released from the encapsulation and, if necessary, triggered. Once released or triggered, the filtercake breaker reacts with the filtercake to degrade or destroy the filtercake, thereby accomplishing filtercake removal.

In any of the implementations described in this disclosure, the multiple filtercake chemicals can include a terpene base fluid and at least one of an organic acid or a catalyst solution. The mixture of the terpene base fluid with the organic acid initiates the polymerization of the terpene fluid (for example, d-limonene, pinene or other terpene fluid) which is highly exothermic as described below. The exothermic reaction can cause a temperature differential sometimes in excess of 300° F. The byproduct of the exothermic reaction excludes gases. In other words, the exothermic reaction resulting from using the multiple filtercake chemicals described here generates only exotherms (i.e., heat) and does not generate any gaseous byproducts. In some instances, the byproducts can include a low molecular weight resin material, but no gases. Because gases are not generated as a byproduct of the exothermic reaction, the pressure at the location will not be affected by the reaction. Moreover, a rate of the exothermic reaction described here is high allowing downhole temperature to increase rapidly. Thus, the exothermic reaction be implemented for high volumetric flow rates of drilling fluids. Also, higher reaction rates enables better controlling a time of the chemical release from delayed breakers.

Figure 4:
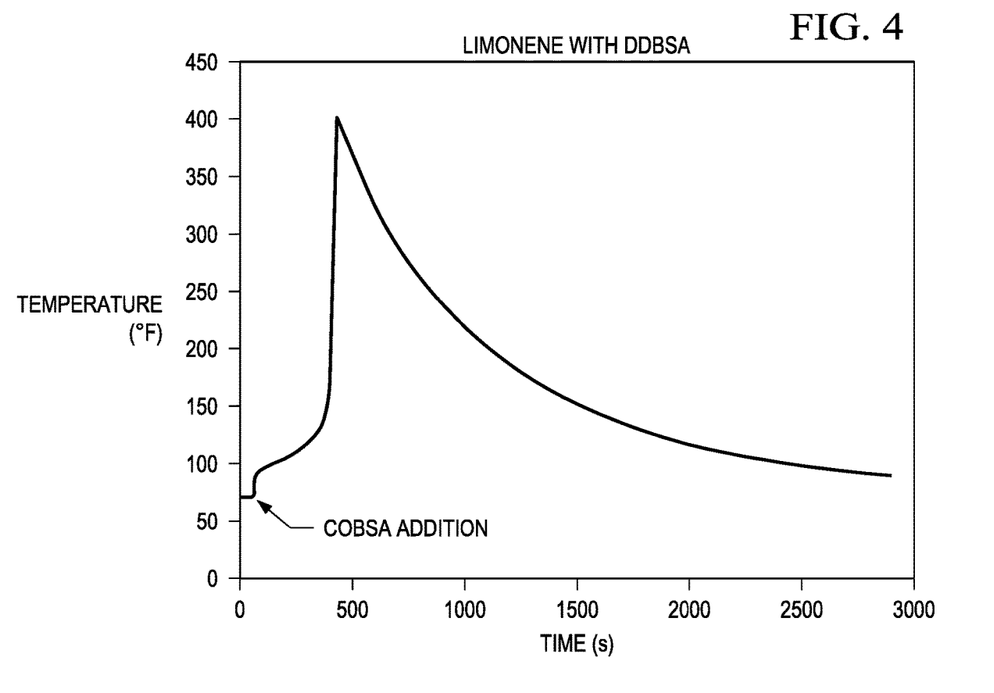
FIG. 4 is a temperature versus time plot showing an increase in temperature resulting from mixing limonene with dodecylbenzylsulfonic acid (DDBSA).
Figure 5:
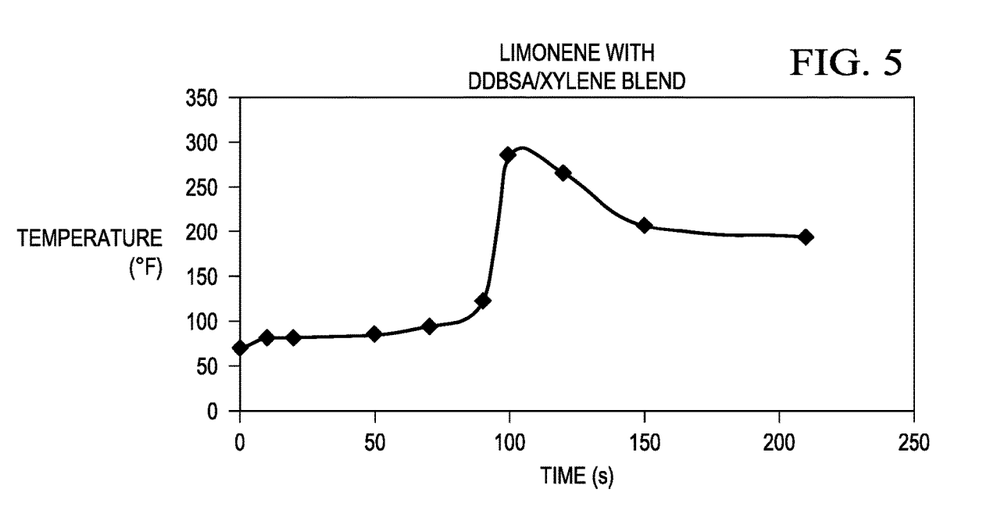
FIG. 5 is a temperature versus time plot showing an increase in temperature resulting from mixing limonene with a DDBSA/Xylene blend.
Figure 6:
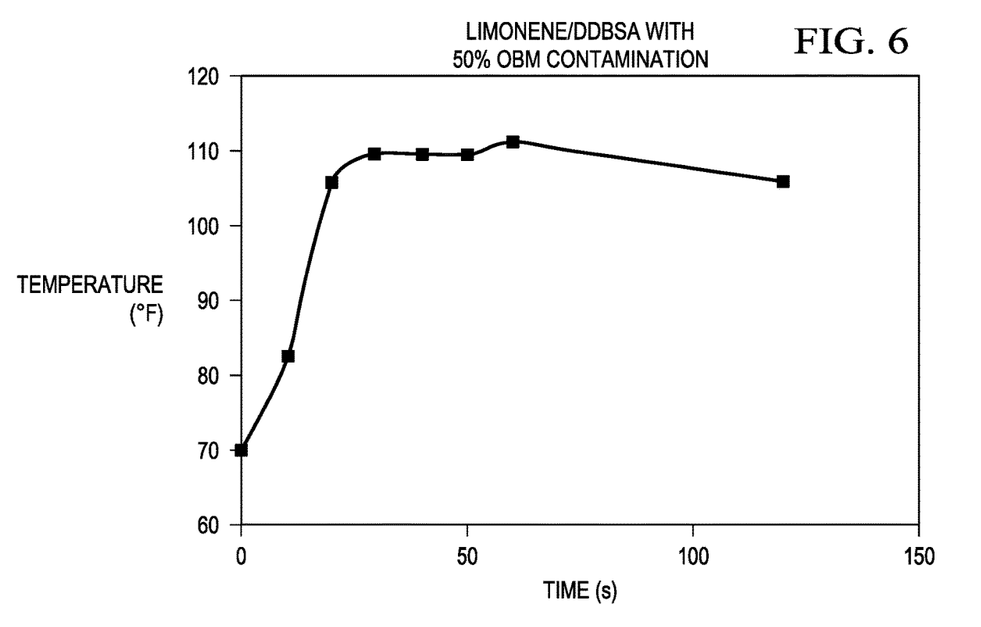
FIG. 6 is a temperature versus time plot showing an increase in temperature resulting from mixing limonene and DDBSA with a 50% oil-based mud (OBM) contamination.

In some implementations, the terpene base fluid can include limonene and the organic acid can include dodecylbenzylsulfonic acid (DDBSA). FIG. 4 is a temperature versus time plot showing an increase in temperature resulting from mixing limonene with DDBSA. As shown in FIG. 4, the addition of DDBSA causes a slow exotherm about 5 seconds after addition followed by a rapid temperature increase from about 100° F. to about 400° F. In some implementations, the terpene base fluid can include limonene and the organic acid can include a DDBSA/Xylene blend. FIG. 5 is a temperature versus time plot showing an increase in temperature resulting from mixing limonene with a DDBSA/Xylene blend. As shown in FIG. 5, the addition of about 12 milliliters (ml) of DDBSA/Xylene blend to about 20 ml of limonene resulted in a 250° F. temperature differential. In some implementations, the terpene base fluid can include limonene and the organic acid can include DDBSA with a 50% oil-based mud (OBM) contamination. FIG. 6 is a temperature versus time plot showing an increase in temperature resulting from mixing limonene and DDBSA with a 50% OBM contamination. As shown in FIG. 6, mixing about 20 ml of limonene, about 10 ml of DDBSA and about 20 ml of oil-based mud causes an exothermic reaction with an upper exotherm limit being comparatively lower than upper lower therm limits in the plots shown in FIGS. 4 and 5, respectively.

In any of the implementations described in this disclosure, the multiple filtercake chemicals can be flowed to the portion of the hydrocarbon reservoir (or wellbore) in which the filtercake is formed by implementing the following techniques. The multiple filtercake chemicals can be mixed with the drilling fluid, and the drilling fluid mixed with the multiple filtercake chemicals can be flowed to the portion of the hydrocarbon reservoir (or wellbore). In some implementations, the multiple filtercake chemicals can be mixed with each other before flowing the multiple filtercake chemicals to the portion of the hydrocarbon reservoir. For example, the multiple filtercake chemicals can be mixed with each other at a surface of the hydrocarbon reservoir, for example, the surface 20 of the hydrocarbon reservoir 10. In such implementations, the filtercake chemicals can be pumped in the same tubing through which the drilling fluid is pumped.

In some implementations, the filtercake chemicals can be pumped using dedicated tubing separate from the drilling fluid tubing. The length of the dedicated tubing can be selected based on a location of the filtercake in the hydrocarbon reservoir (or wellbore). Using dedicated pumps, the filtercake chemicals can be pumped from the surface 20 of the hydrocarbon reservoir 10 through the dedicated tubing. In such implementations, the filtercake chemicals can be pumped in a carrier fluid, for example, the drilling fluid. Pumping the filtercake chemicals using dedicated tubing and pumps can allow flowing the filtercake chemicals to the portion of the hydrocarbon reservoir (or wellbore) at a flow rate (or flow rates) that is (or are) different from the flow rate of the drilling fluid during drilling operation.

In some implementations, to mix the multiple filtercake chemicals, a first filtercake chemical, for example, one of the terpene base fluid or the organic acid or the catalyst solution, can be flowed from a surface of the hydrocarbon reservoir toward the portion of the hydrocarbon reservoir by adding the first filtercake chemical to the drilling fluid. After adding the first filtercake chemical, a second filtercake chemical, for example, the other of the terpene base fluid or the organic acid or the catalyst solution, can be flowed from the surface of the hydrocarbon reservoir toward the portion of the hydrocarbon reservoir by adding the second filtercake chemical to the drilling fluid. A different in a density of the first filtercake chemical and a density of the second filtercake chemical causes the two filtercake chemicals to mix before a mixture of the two filtercake chemicals reaches the portion of the hydrocarbon reservoir. The in-situ heat generated from the exothermic reaction that results from the mixture releases or triggers the filtercake breaker (or both) to degrade or destroy the filtercake. In some implementations, a volumetric flow rate of at least one of the multiple filtercake chemicals can be controlled to cause the first filtercake chemical and the second filtercake chemical to mix before reaching the portion of the hydrocarbon reservoir.

Figure 7:
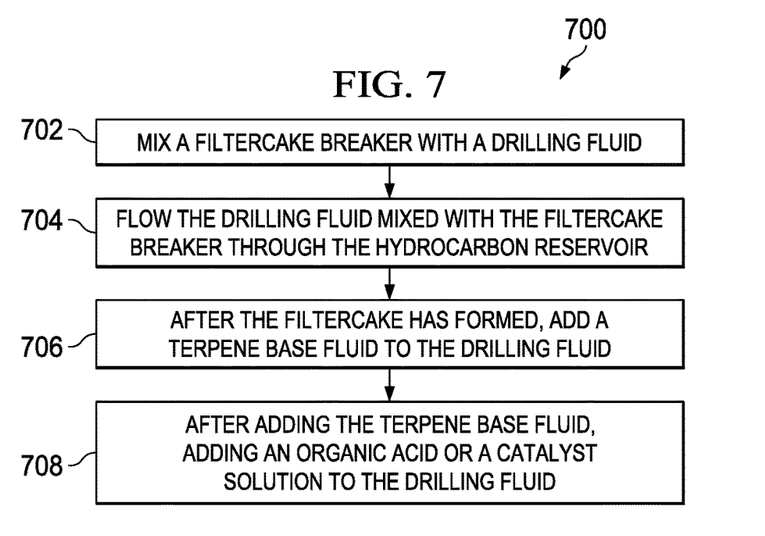
FIG. 7 is a flowchart of an example process for degrading filtercake in a hydrocarbon reservoir.

FIG. 7 is a flowchart of an example process 700 for degrading filtercake in a hydrocarbon reservoir. In some implementations, the process 700 can be implemented by a drilling rig operator during the drilling operation or before completion of the wellbore, for example, the wellbore 14. At 702, a filtercake breaker is mixed with a drilling fluid similar to step 202 described above with reference to FIG. 2. The filtercake breaker may or may not be encapsulated prior to mixing with the drilling fluid. At 704, the drilling fluid mixed with the filtercake breaker is flowed through a hydrocarbon reservoir, for example, the hydrocarbon reservoir 10, in which a wellbore, for example, the wellbore 14, is being drilled similar to step 204 described above with reference to FIG. 2. A filtercake forms in a portion of the hydrocarbon reservoir (or the wellbore) responsive to flowing the drilling fluid. As described above, the filtercake breaker (encapsulated or unencapsulated) is mixed with or embedded within the filtercake that forms in the portion. At 706, a terpene base fluid is added to the drilling fluid after the filtercake has formed. At 708, after adding the terpene base fluid, an organic acid or a catalyst solution is added to the drilling fluid. In some implementations, the terpene base fluid can be pumped in a pill followed by a thin barrier fluid. The organic acid, for example, DDBSA, or catalyst solution, for example, a catalyst solution containing Lewis acid, can then be pumped downhole. The resulting exothermic reaction can generate a temperature differential that is sufficient to increase a downhole temperature to a temperature at which the filtercake breaker is triggered (or released from the encapsulation and then triggered) to degrade or destroy the filtercake.

The exothermic reactions described above were caused by mixing two filtercake chemicals. In some implementations, more than two filtercake chemicals can be mixed to cause the exothermic reaction or to adjust a temperature differential resulting from the exothermic reaction. In some implementations, the filtercake chemicals used to cause the downhole exothermic reaction can include monomers such as acrylates, acrylamides, styren, or other monomers with initiators such as acid, caustic, radical generating Azo and peroxide species. Other examples of filtercake chemicals can include combinations of polyamines and fatty acids mixed downhole resulting in initial salt formation with a temperature in excess of 70° C. In general, any combination of filtercake chemicals can be used to cause the exothermic reaction (for example, organic acids and bases, inorganic acids and bases such as Alkali metal hydroxides and hydrochloric acid) as long as the byproducts of the reaction excludes gases.

Thus, particular implementations of the subject matter have been described. Other implementations are within the scope of the following claims.

The invention claimed is:

1. A method of degrading filtercake in a hydrocarbon reservoir, the method comprising:
    encapsulating a filtercake breaker with an encapsulation configured to prevent the encapsulated filtercake breaker from directly contacting a filtercake, wherein the filtercake breaker is configured to degrade filtercake at a temperature;
    mixing the encapsulated filtercake breaker with a drilling fluid;
    flowing the drilling fluid mixed with the encapsulated filtercake breaker through a hydrocarbon reservoir in which a wellbore is being drilled, wherein a filtercake forms in a portion of the hydrocarbon reservoir responsive to flowing the drilling fluid, wherein the encapsulated filtercake breaker is embedded within the filtercake, wherein a temperature of the portion of the hydrocarbon reservoir is less than the temperature at which the filtercake breaker is configured to degrade filtercake; and
    flowing a plurality of filtercake chemicals to the portion of the hydrocarbon reservoir, wherein the plurality of filtercake chemicals, when mixed, are configured to react in an exothermic reaction to release heat to increase the temperature of the portion of the hydrocarbon reservoir to at least a temperature at which the filtercake breaker is released from the encapsulation and the filtercake breaker is configured to degrade the filtercake in which the filtercake breaker is embedded, wherein a byproduct of the exothermic reaction excludes gases, wherein a pressure at the portion of the hydrocarbon reservoir is unaffected by the exothermic reaction.

2. The method of claim 1, wherein the plurality of filtercake chemicals comprises a terpene base fluid and at least one of an organic acid or a catalyst solution.

3. The method of claim 2, wherein the organic acid comprises dodecylbenzylsulfonic acid (DDBSA).

4. The method of claim 2, wherein the catalyst solution comprises a Lewis acid.

5. The method of claim 1, further comprising mixing the plurality of filtercake chemicals with each other before flowing the plurality of filter cake chemicals to the portion of the hydrocarbon reservoir.

6. The method of claim 5, wherein mixing the plurality of filtercake chemicals with each other comprises mixing the plurality of filtercake chemicals with each other at a surface of the hydrocarbon reservoir.

7. The method of claim 1, wherein mixing the plurality of filtercake chemicals comprises:
    flowing a first filtercake chemical of the plurality of filtercake chemicals from a surface of the hydrocarbon reservoir toward the portion of the hydrocarbon reservoir; and
    after flowing the first filtercake chemical, flowing a second filtercake chemical of the plurality of filtercake chemicals from the surface of the hydrocarbon reservoir toward the portion of the hydrocarbon reservoir, wherein a difference in a density of the first filtercake chemical and a density of the second filtercake chemical causes the first filtercake chemical and the second filtercake chemical to mix before a mixture of the first filtercake chemical and the second filtercake chemical reaches the portion of the hydrocarbon reservoir.

8. The method of claim 7, further comprising controlling a volumetric flow rate of at least one of the first filtercake chemical or the second filtercake chemical to cause the first filtercake chemical and the second filtercake chemical to mix before reaching the portion of the hydrocarbon reservoir.

* * * * *